United States Patent
Tagawa et al.

(10) Patent No.: US 7,742,072 B2
(45) Date of Patent: Jun. 22, 2010

(54) MONITORING IMAGE RECORDING APPARATUS

(75) Inventors: Haruo Tagawa, Itabashi-ku (JP); Naoki Ohkawa, Yokohama (JP); Takuya Yamauchi, Akiruno (JP); Hiroshi Kimata, Yokohama (JP)

(73) Assignee: Panasonic Corporation, Osaka (JP)

( * ) Notice: Subject to any disclaimer, the term of this patent is extended or adjusted under 35 U.S.C. 154(b) by 1174 days.

(21) Appl. No.: 10/939,228

(22) Filed: Sep. 10, 2004

(65) Prior Publication Data

US 2005/0057652 A1 Mar. 17, 2005

(30) Foreign Application Priority Data

Sep. 11, 2003 (JP) .............................. 2003-319395

(51) Int. Cl.
*H04N 7/18* (2006.01)
(52) U.S. Cl. ..................................................... 348/154
(58) Field of Classification Search ................. 348/154, 348/155
See application file for complete search history.

(56) References Cited

U.S. PATENT DOCUMENTS 5,091,780 A * 2/1992 Pomerleau .................. 348/152

| 5,097,328 A | 3/1992 | Boyette |
| 6,304,895 B1 * | 10/2001 | Schneider et al. ........... 709/203 |
| 6,411,209 B1 | 6/2002 | Kodera et al. |
| 6,434,320 B1 | 8/2002 | Orth et al. |
| 6,434,370 B1 | 8/2002 | Kodera et al. |

FOREIGN PATENT DOCUMENTS

| CN | 1404695 A | 3/2003 |
| JP | 05-167978 | 7/1993 |
| JP | 11-098458 | 4/1999 |
| JP | 2000-175086 | 6/2000 |
| JP | 2002-171483 | 6/2002 |

OTHER PUBLICATIONS

Japanese Office Action Dated Sep. 13, 2007.
English summary of Chinese Office action, Jan. 18, 2008.

* cited by examiner

*Primary Examiner*—Y. Lee
*Assistant Examiner*—Richard Torrente
(74) *Attorney, Agent, or Firm*—Pearne & Gordon LLP

(57) ABSTRACT

The present invention provides a monitoring image recording apparatus capable of searching image data stored in a hard drive at high speeds. In this invention, video signals input from cameras 10 are detected by motion detector 14, and the difference of search results is stored in a hard drive 18 as incidental information of image data. When playing, based on the incidental information of image data, it is determined whether or not a motion is present within a set range. If motion is present, image data stored in the hard drive 18 is output to a monitor television 23.

11 Claims, 5 Drawing Sheets

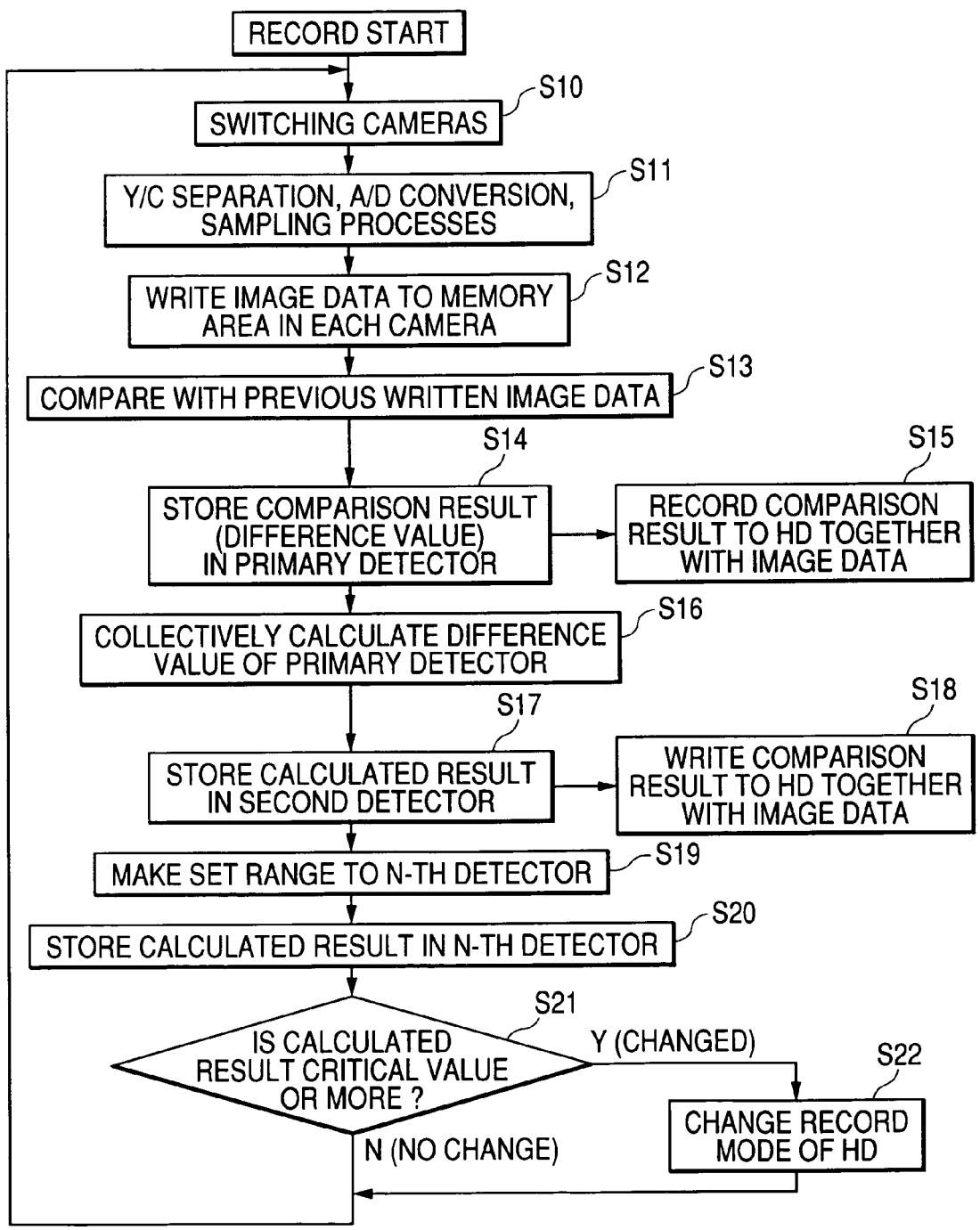

51 PREVIOUS IMAGE

52 CURRENT IMAGE

53 COMPARISON RESULT (PRIMARY DETECTOR)

54 COMPARISON RESULT (SECOND DETECTOR)

55 COMPARISON RESULT (N-TH DETECTOR)

MONITORING IMAGE RECORDING APPARATUS

BACKGROUND OF THE INVENTION

1. Field of the Invention

The present invention relates to a monitoring image recording apparatus comprising a motion detecting circuit for detecting motions of an object from input image signals.

2. Description of the Related Art

A conventional monitoring image recording apparatus typically has a motion detecting circuit for playing a desired image including a motion area from images recorded for a long time, in which the motion detecting circuit compares two image data recorded at different time in a recording medium to each other, and extracts and plays the selected image including a motion area (Patent Document 1: Japanese Unexamined Patent Application Publication No. 2002-171483).

However, in the conventional monitoring image recording apparatus, in order to detect motion, two image data recorded at different time from the recording medium is compared to each other, which results in preventing an image having the motion from being searched at high speeds.

SUMMARY OF THE INVENTION

In order to the above problem, it is an object of the present invention to provide a monitoring image recording apparatus which is capable of searching an image including a motion area at high speeds.

An monitoring image recording apparatus according to the present invention comprises a motion detecting unit for detecting motions. The motion detecting unit includes a memory for storing video signals of two different image data to be input from cameras, a comparator for comparing the video signals of two different image data stored in the memory at every predetermined pixel unit, and a primary detector for storing a difference at every primary predetermined pixel unit compared by the comparator. The monitoring image recording apparatus further comprises a recording medium for recording image data to be input from the cameras, and a control unit for controlling the recording medium, in which the control unit records the difference at every primary predetermined pixel unit stored in the primary detector to the recording medium, together with image data.

According to this construction, at the time of detecting the motions, it is possible to search an image including a motion area at high speeds.

In the monitoring image recording apparatus according to the present invention, the primary detector stores a plurality of differences at every primary predetermined pixel unit, and the motion detecting unit further includes a second detector for detecting a difference at every second predetermined pixel unit, based on adjacent differences at every primary predetermined pixel unit among the plurality of differences at every primary predetermined pixel unit stored in the primary detector, in which a difference at every second predetermined pixel unit calculated by the second detector is recorded to the recording medium, together with the image.

According to this construction, it is possible to search an image including a motion area at higher speeds.

The monitoring image recording apparatus according to the present invention further comprises an operating unit for setting a search range of motions, and the motion detecting unit further includes a third detector for detecting a difference at every third predetermined pixel unit within the search range set by the operating unit, based on the plurality of differences at every primary predetermined pixel unit stored in the primary detector, in which, when the difference at every third predetermined pixel unit calculated by the third detector is a predetermined critical value or more, a mode for recording images to the recording medium is changed.

According to this construction, it is possible to record efficiently when motion is detected in an area set by a user.

According to the monitoring image recording apparatus of the present invention, it is possible to provide a monitoring image recording apparatus, which is capable of searching an image including a motion area at high speeds.

BRIEF DESCRIPTION OF THE DRAWINGS

FIG. 3 is a flowchart in a record mode of the monitoring image recording apparatus according to the embodiment of the present invention;

Figure 1:
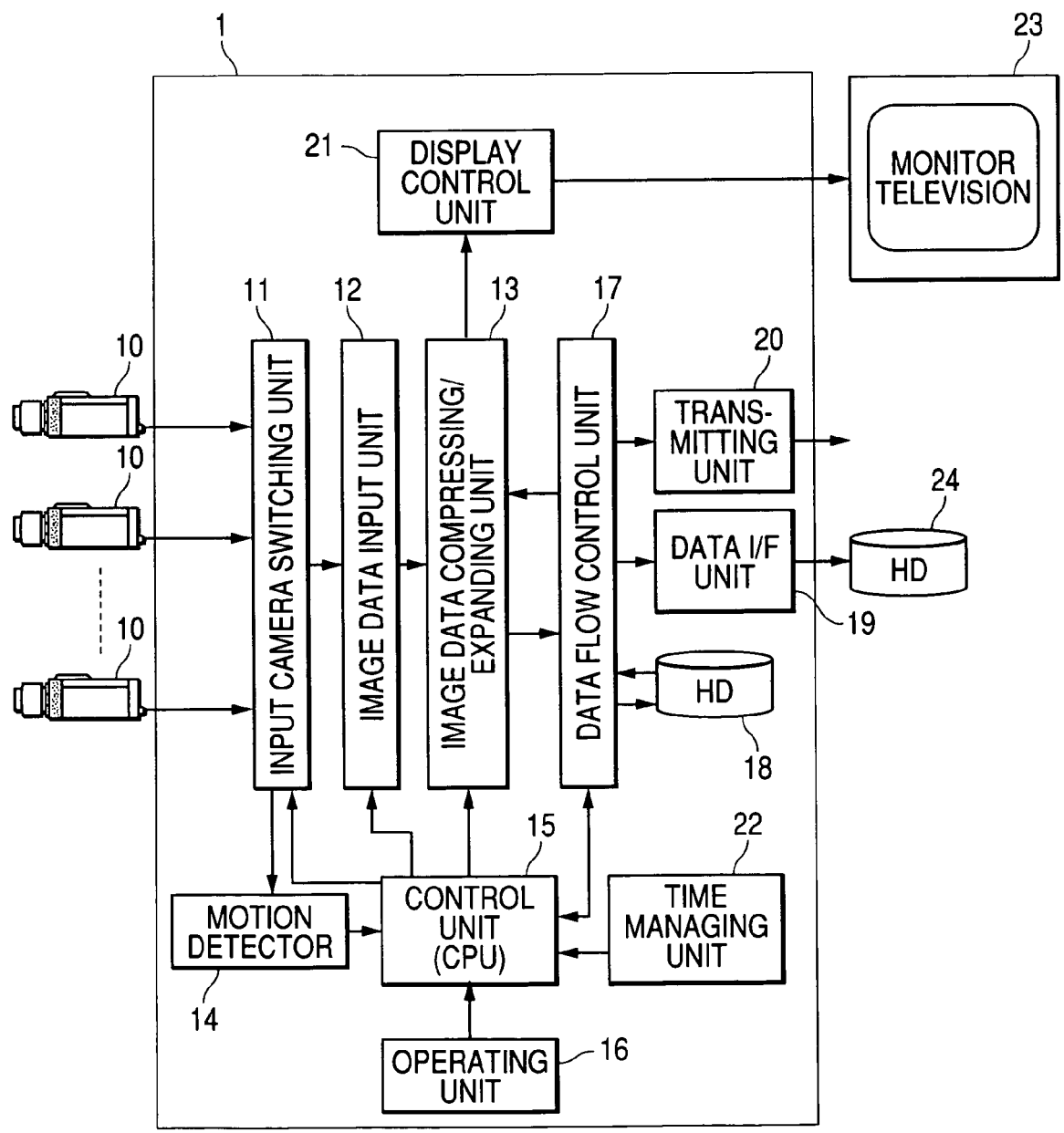
FIG. 1 is a block diagram of a monitoring image recording apparatus according to an embodiment of the present invention.
Figure 2:
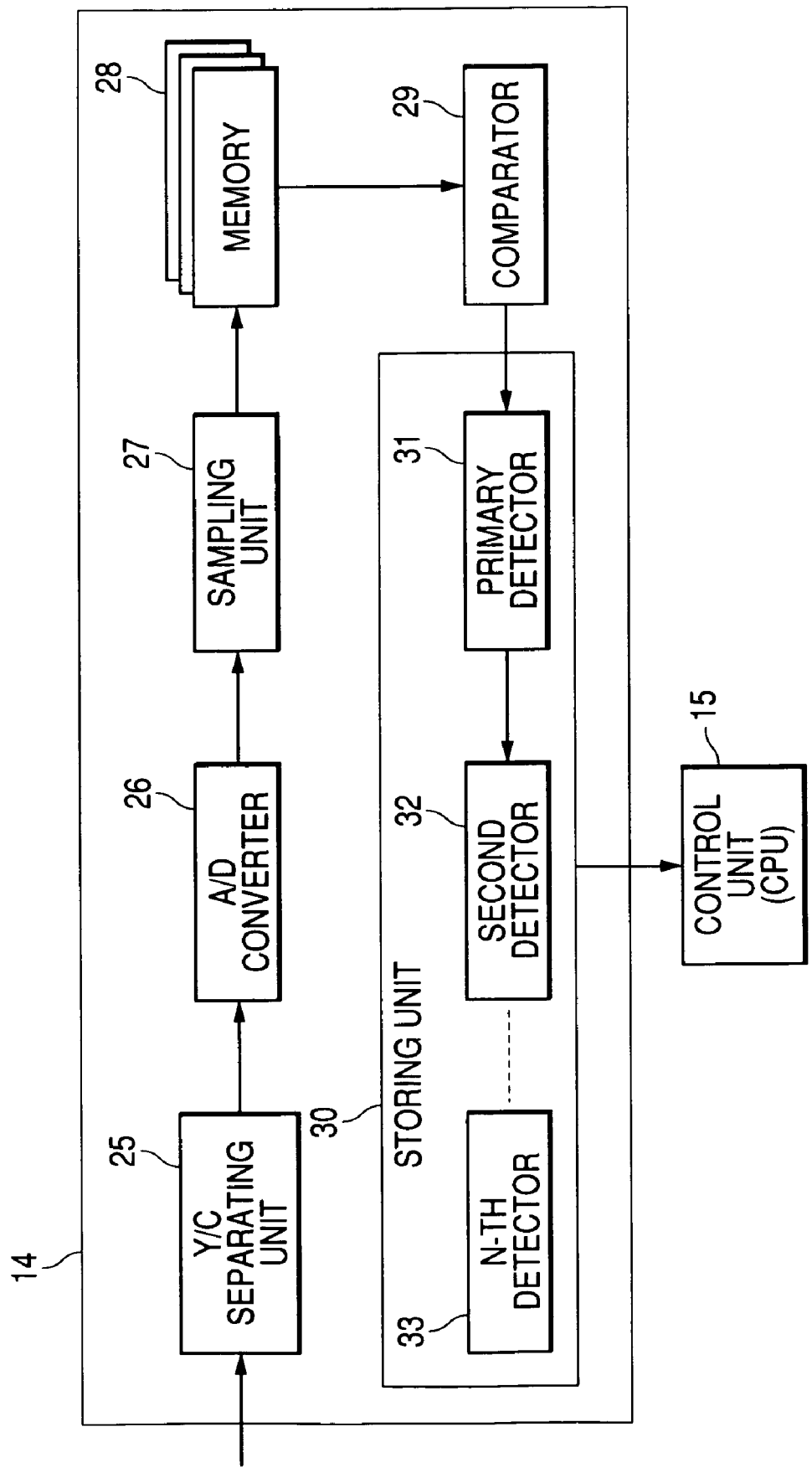
FIG. 2 is a block diagram of a motion detector according to the embodiment of the present invention.

In the drawings, a reference numeral 10 refers to a camera; 11 to an input camera switching unit; 12 to an image data input unit; 13 to an image data compressing/expressing unit; 14 to a motion detector; 15 to a control unit (CPU); 16 to an operating unit; 17 to a data flow control unit; 18, 24 to an hard drive (HD); 19 to a data I/F unit; 20 to a transmitting unit; 21 to a display control unit; 22 to a time managing unit; 23 to a monitor television; 25 to an Y/C separating unit; 26 to an A/D converter; 28 to a memory; 29 to a comparator; 30 to a storing unit; 31 to a primary detector; 32 to a second detector; and 33 to a n-th detector.

DETAILED DESCRIPTION OF THE PREFERRED EMBODIMENTS

Hereinafter, an embodiment of the present invention will be described with reference to the attached drawings.

FIG. 1 is a block diagram of a monitoring image recording apparatus showing a construction of an embodiment of the present invention. The monitoring image recording apparatus 1 comprises an input camera switching unit 11, an image data input unit 12, an image data compressing/expanding unit 13, a motion detector 14, a control unit 15, an operating unit 16, a data flow control unit 17, a hard disk (hereinafter, referred to as HD) 18, a data I/F unit 19, a transmission unit 20, a display control unit 21, and a time managing unit 24.

The input camera switching unit 11 receives video signals from a plurality of cameras 10 and outputs a video signal of one camera 10 among the input video signals of the plurality of cameras 10 to the image data input unit 12. For example, the input camera switching unit 11 switches the video signals from the plurality of cameras 10 at an interval of 1/60 second or 1/30 second and outputs the video signals to the image data input unit 12 and the motion detector 14.

The image data input unit 12 performs a signal processing such as an A/D conversion for outputting the video signals outputted from the input camera switching unit 11 to the image data compressing/expanding unit 13.

The image data compressing/expanding unit 13 compresses the respective video signals from the image data input unit 12 and outputs the compressed video signal as image data to the data flow control unit 17. Further, when playing image data stored in the HD 18, the image data compressing/expanding unit 13 expands compressed image data recorded in the HD 18 via the data flow control unit 17 and outputs expanded image data to the display control unit 21.

The motion detector 14 comprises an Y/C separating unit 25, an A/D converter 26, a sampling unit 27, a memory 28, a comparator 29, and a storing unit 30. The Y/C separating unit 25 separates the respective video signals input from the input camera switching unit 11 into a brightness signal and a color signal. The A/D converter 26 converts an analog signal of the brightness signal or the color signal separated by the Y/C separating unit 25 into a digital signal. The sampling unit 27 performs a sampling the digital signal converted by the A/D converter 26 at a specified frequency. The memory 28 temporarily stores image data outputted from the sampling unit 27. The comparator 29 compares two image data of different time stored in the memory 28 at a primary detection unit of every predetermined pixel unit. The storing unit 30 comprises a primary detector 31 for detecting a difference of two image data of different time compared by the comparator 29 at every primary detection unit, a second detector 32 for collecting adjacent areas of the primary detection unit to detect a difference at every predetermined pixel unit larger than the primary detection unit, and a n-th detector 33 in which the user can set a plurality of detection ranges. The storing unit 30 stores numeric values of the differences detected by the primary detector 31, the second detector 32 and the n-th detector 33.

The control unit (CPU) 15 controls overall the monitoring image recording apparatus 1. The control unit 15 performs controls such as a switching timing of the input camera switching unit 15, writing and reading timings of the data flow control unit 17 to the HD 18, and so on.

The operating unit 16 is intended to perform switching of a record mode and a play mode or setting of a detection area (range) in which the motion detection is performed. Further, in the play mode, the operating unit 16 may perform setting of, for example, the size of an object to which the motion detection is performed, other than the setting of the detection area (range).

The data flow control unit 17 is intended to associate image data compressed by the image data compressing/expanding unit 13 and information regarding image data, and output it to the HD 18. Information regarding image data includes, for example, a time to be managed by the time managing unit 22 or the numeric values of the differences detected by the motion detector 14.

The HD 18 associates image data and the numeric values via the data flow control unit 17 and records the associated information.

The data I/F unit 19 is an interface unit for recording to an additional HD 24 connected externally to the monitoring image recording apparatus 1.

The transmitting unit 20 is intended to transmit image data compressed by the image data compressing/expanding unit 13 via a network (not shown). The display control unit 21 is intended to output videos of the cameras 10 stored in the HD 18 to a monitor television that is connected to the monitoring image recording apparatus 1. The time managing unit 24 is intended to associate the time and image data and record the associated information when image data is recorded to the HD 18.

Next, an operation of the monitoring image recording apparatus of the present invention will be described with reference to FIGS. 3 to 5. FIG. 3 is a flowchart in a record mode of a monitoring image recording apparatus according to the embodiment of the present invention. FIG. 4 is an explanatory view showing a process of a motion detector of the monitoring image recording apparatus according to the embodiment of the present invention. FIG. 5 is a flowchart in a play mode of the monitoring image recording apparatus according to the embodiment of the present invention.

To begin with, in the case in which videos from the cameras 10 are recorded to the monitoring image recording apparatus 1, an operation of the monitoring image recording apparatus 1 will be described.

If the monitoring image recording apparatus 1 is set to the record mode by the operating unit 16, the control unit (CPU) 15 controls the input camera switching unit 11 to be switched at a predetermined interval (S10). Further, the switching timing is not specifically limited, but may be set to ⅟₆₀ second or 1 second. The video signals outputted from the input camera switching unit 11 are input to the image data input unit 12 and are subjected to a signal processing such as the A/D conversion. The video signals processed by the image data input unit 12 are compressed into image data such as JPEG by the image data compressing/expanding unit 13. Image data compressed by the image data compressing/expanding unit 13 are recorded in the HD 18 via the data flow control unit 17.

Meanwhile, the video signals outputted from the input camera switching unit 11 are input to the motion detector 14. The respectively video signals input to the motion detector 14 are separated into a brightness signal and a color signal by the Y/C separating unit 25. The brightness signal separated by the Y/C separating unit 25 is input to the A/D converter 26 and is converted into image data of a digital signal. Image data outputted from the A/D converter 26 is subjected to a sampling process at a specified frequency in the sampling unit 27 (S11). Image data sampled by the sampling unit 27 is stored in each memory area for each camera of the memory 28 (S12). Moreover, in the present embodiment, the brightness signal is subjected to the A/D conversion and is stored in the memory 28, but the color signal may be used.

Further, the comparator 29 compares image data of the same camera written in the memory 28 for a pervious timing and image data written in the memory 28 for a current timing to each other at every primary detection unit (S13), and stores temporarily a comparison result (a difference value) at every primary detection unit in the primary detector 31 (S14). The comparison result (the difference value) at every primary detection unit stored in the primary detector is recorded as incidental information of image data to the HD 18 via the data flow control unit 17 (S15).

Here, in the case of designating a certain range and searching a video of a time having a motion during playing, it is sufficient to examine presence/absence of the motion using the difference value and read image data of the time having the motion from the HD 18. Thus, since the amount of data to be processed is little as compared with a conventional method of comparing image data with each other, it is possible to search at high speed.

Further, an average value of the comparison result (the difference value) at every primary detection unit stored in the primary detector 31 and the comparison result (the difference value) at every primary detection unit of adjacent areas stored in the primary detector 31 is calculated and the calculated value is collected to calculate a comparison result (a difference value) at every predetermined pixel unit (second predetermined pixel unit) larger than the primary detection unit (S16), and the calculated result is stored in the second detector 32 (S17). The comparison result (the difference value) at every second predetermined pixel unit stored in the second detector 32 is recorded as incidental information of image data to the HD 18 (S18). In addition, by repeating the same steps, a comparison result (a difference value) at every other predetermined pixel unit may be recorded as incidental information of image data to the HD 18.

Further, the user can designate the range for detecting the motion and set the range for comparing previous image data and current image data with each other, through the operating unit 16 (S19). And then, the comparison result (the difference value) at every primary detection unit stored in the primary detector 31 within the set range is calculated and the calculated result is stored in the n-th detector 33 (S20). Subsequently, it is determined whether the calculated result is a predetermined critical value or more or not (S21). If so, it is determined that 'the motion detection is present', and the record mode of the HD 18 is changed (S22). More specifically, the switching of the cameras in the input camera switching unit is normally performed in an order of a camera A, a camera B and a camera C. Here, in the case in which it is determined that 'the motion detection is present' in the camera A, the switching of the cameras is controlled in an order of the camera A, the camera B, the camera A, the camera C and the camera A such that the switching of the camera determined that 'the motion detection is present' is preferentially performed. Up to now, it is described that the range in which the motion is detected is one, but a plurality of ranges may be designated. For example, in the case in which the motions are detected simultaneously in the camera A and the camera B, the record mode may be changed. As regards the simultaneousness, the time managing unit 22 manages the time, and the control unit 15 determines the simultaneousness based on the time information. In addition, in the case in which the motion is detected in the camera B in several seconds after the motion is detected, it is possible to set the record mode to be changed. This can be efficiently applied to a case in which a person coming in an entrance is preferentially recorded and a person going out the entrance may be not recorded.

Next, a method of obtaining the comparison result (the difference value), which is a process of the motion detector 14, will be described with reference to FIGS. 4A to 4E.

Figure 4A:
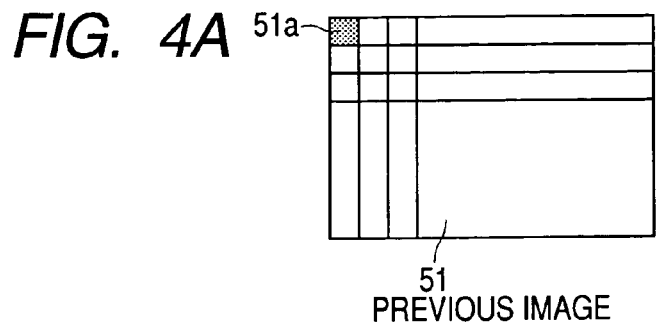
FIGS. 4A to 4E are an explanatory views showing a process of the motion detector in the monitoring image recording apparatus according to the embodiment of the present invention.
Figure 4B:
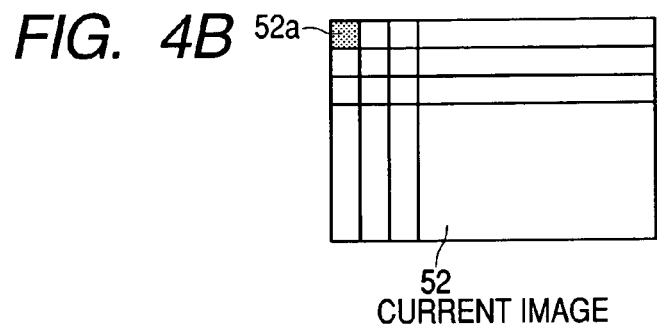
Figure 4C:
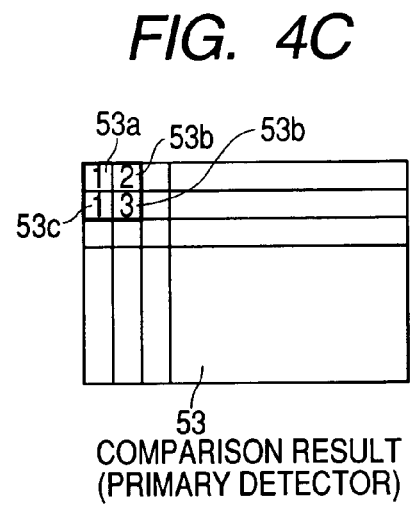
Figure 4D:
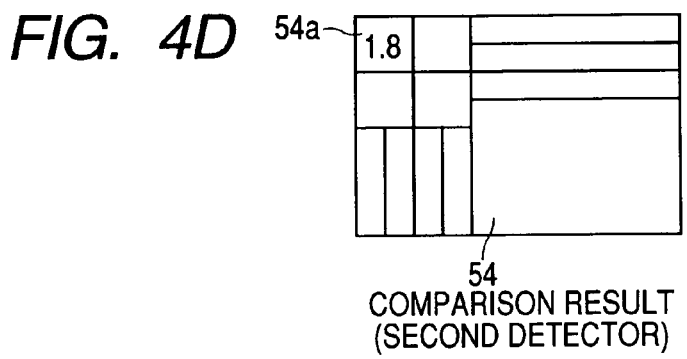
Figure 4E:
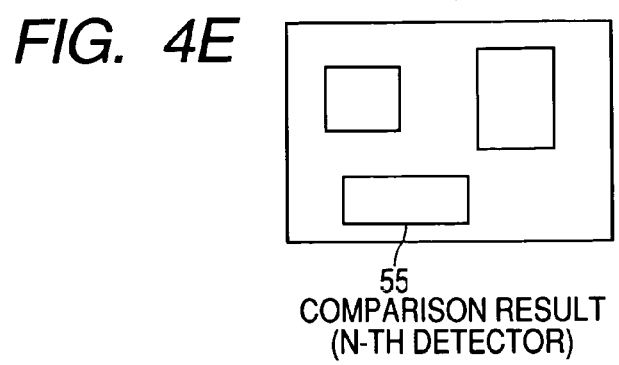
Figure 5:
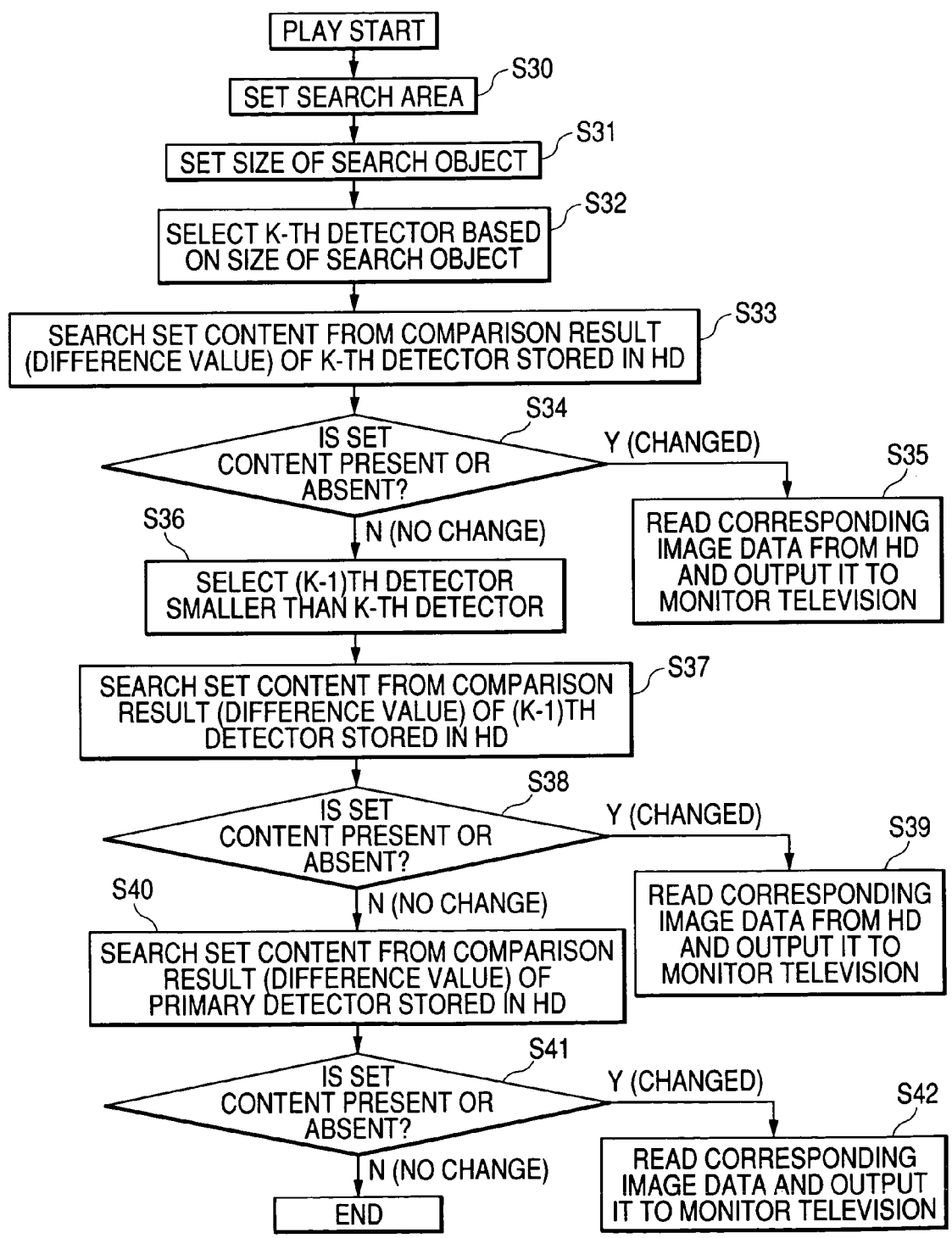
FIG. 5 is a flowchart in a play mode of the monitoring image recording apparatus according to the embodiment of the present invention.

Referring to FIGS. 4A and 4B, image data of the same camera is written in the memory 28, in which one written for a faster timing is a previous image 51 and other written for a slower timing is a current image 52.

A primary detection unit 51*a* of the previous image 51 is comprised of, for example, 3 pixels×3 pixels of the previous image 51. Similarly, a primary detection unit 52*a* of the current image 52 is comprised of, for example, 3 pixels×3 pixels of the current image 52.

Next, a difference between a brightness level of the primary detection unit 51*a* of the previous image 51 and a brightness level of the primary detection unit 52*a* of the current image 52 is calculated, and a primary detection unit 53*a* of the comparison result 53 is stored in the primary detector 31. In the case in which the brightness level of the primary detection unit 51*a* of the previous image 51 is set to 5.6 and the brightness level of the primary detection unit 52*a* of the current image 52 is set to 6.8, the difference between them is 1.2, and a rounded-off value '1' stores in the primary detection unit 53*a* as the primary detection unit 53*a* of the comparison result 53. Since this value is a numerical value (multi-level value), not two-level value, it is possible to increase the precision of the motion detection.

Similarly, primary detection units 53*b*, 53*c* and 53*d* close to the primary detection unit 53*a* are calculated, an average value of them is obtained, and then the average value is stored in the second detector 32 as a comparison result 54*a*.

Further, as regards the range which the user sets by detecting presence/absence of the motion, it is constructed that a primary detection unit is calculated, an average value of the primary detection units is obtained, and the average value is stored in the n-th detector as a comparison result (a difference value). In addition, if the comparison result (the difference value) stored in the n-th detector is a critical value or more, it is determined that the motion is present, and then a process such as the change of the record mode is performed.

Next, a case of searching and playing a scene having a motion in an area set by the user among image data recorded in the HD 18 will be described with reference to FIG. 5.

A search area and a search object is set by the operation unit (S30 and S31). Here, the control unit 15 selects an optimal detector (a K-th detector) from the plurality of detectors according to a size of the search object (S32). Further, the control unit 15 searches presence/absence of the motion of the object in the search area from a comparison result (a difference value) of the K-th detector stored in the HD 18 (S33), and determines presence/absence of the motion (S34). If the motion is present, the control unit 15 reads corresponding image data from the HD 18 and outputs to the monitor television (S35).

Moreover, if the motion is not detected, the control unit 15 may select a (K−1)th detector in which data at every predetermined pixel unit smaller than that of the K-th detector is stored, and perform the same search (S37 to S42).

A plurality of search areas may be set, and an order of detecting the motion thereto may be designated. This allows the time information being managed in the time managing unit 22 to be written the HD 18 as incidental information of image data, when recording. If doing so, for example, when a person in an entrance is shot with a monitoring camera provided in an ATM of a bank, a person coming in the entrance is shot in a front view, while a person going out the entrance is shot in a back view, such that it is impossible to specify a person. However, even in this case, it is possible to perform an efficient search by allowing playing only when a motion in the vicinity of the ATM is detected after an initial motion is detected in the vicinity of the entrance. Further, even in the case in which the recording is performed with a plurality of cameras, it is possible to detect a video when a motion is detected in the camera B after a motion is detected in the camera A, by allowing the control unit 15 to record numbers of the cameras as incidental information of image data when recording to the HD 18. In the case in which such a complicated search is performed, it is possible to search using only the incidental information of image data recorded in the HD 18. Thus, it is possible to search at high speed. Further, it is preferable to allow image data to be outputted only when playing. By performing such a process, it is possible to reduce the access times of important image data, and further it is possible to reduce a possibility of losing image data when an error is generated during the search.

As described above, the monitoring image recording apparatus according to the present invention is suitable for recording image data from the cameras to the recording medium and searching a scene, which the user desires to view, from image data stored in the recording medium at high speed.

What is claimed is:

1. A monitoring image recording apparatus, comprising:
   a motion detecting unit for detecting motion, including a
      memory for storing video signals of two different image
      data to be input from cameras, a comparator for comparing the video signals of two different image data stored in the memory at every predetermined pixel unit, and a primary detector for storing a difference compared by the comparator at every primary predetermined pixel unit;

a recording medium for recording image data to be input from the cameras;

an operating unit for setting a search object; and a control unit for controlling the recording medium, wherein the primary detector stores a plurality of the differences at every primary predetermined pixel unit, characterized in that the motion detecting unit further includes:

a second detector for calculating a difference value at every second predetermined pixel unit, based on averaging adjacent differences at every primary predetermined pixel unit among the plurality of differences at every primary predetermined pixel unit stored in the primary detector, wherein the second predetermined pixel unit is greater than the primary predetermined pixel unit;

wherein the control unit records the difference value at every second predetermined pixel unit calculated by the second detector to the recording medium, together with image data and searches presence/absence of the motion based on the difference value at every second predetermined pixel unit read from the recording medium; and wherein the control unit selects one of the primary detector and the second detector on the basis of a size of the search object to search presence/absence of the motion of the search object.

2. The monitoring image recording apparatus according to claim 1, wherein the operating unit sets a search range of the motions, wherein the motion detecting unit further includes a third detector for detecting a difference at every third predetermined pixel unit within the search range set by the operating unit, based on the plurality of differences at every primary predetermined pixel unit stored in the primary detector, and wherein, when a difference at every third predetermined pixel unit calculated by the third detector is a predetermined critical value or more, a mode for recording images to the recording medium is changed.

3. The monitoring image recording apparatus according to claim 1, wherein after the second detector is selected to search presence/absence of the motion and the motion is not detected using the second detector, the control unit selects the primary detector to search presence/absence of the motion.

4. The monitoring image recording apparatus according to claim 1, wherein the recording medium comprises a hard drive.

5. The monitoring image recording apparatus according to claim 4, wherein, after a search of the hard drive occurring after the difference value at every second predetermined pixel unit is recorded to the hard drive together with the image data, image data is read from the hard drive and output to a display device upon the control unit detecting presence of the motion from the difference value of a corresponding second predetermined pixel unit read from the hard drive.

6. A surveillance system comprising:

a plurality of monitoring cameras;

a monitoring image recording apparatus; and a display device;

wherein said monitoring image recording apparatus includes:

a motion detecting unit for detecting motion, having a memory for storing video signals of two different image data to be input from cameras, a comparator for comparing the video signals of two different image data stored in the memory at every predetermined pixel unit, and a primary detector for storing a difference compared by the comparator at every primary predetermined pixel unit;

a recording medium for recording image data to be input from the cameras;

an operating unit for setting a search object;

a control unit for controlling the recording medium; and a display control unit for reading image data from the recording medium and outputting the image data to the display device, wherein the primary detector stores a plurality of the differences at every primary predetermined pixel unit, characterized in that the motion detecting unit further includes:

a second detector for calculating a difference value at every second predetermined pixel unit, based on averaging adjacent differences at every primary predetermined pixel unit among the plurality of differences at every primary predetermined pixel unit stored in the primary detector, wherein the second predetermined pixel unit is greater than the primary predetermined pixel unit;

wherein the control unit records the difference value at every second predetermined pixel unit calculated by the second detector to the recording medium, together with the image data and searches presence/absence of the motion based on the difference value at every second predetermined pixel unit read from the recording medium; and wherein the control unit selects one of the primary detector and the second detector on the basis of a size of the search object to search presence/absence of the motion of the search object.

7. The surveillance system according to claim 6, wherein said operating unit sets a search range of the motions, wherein the motion detecting unit further includes a third detector for detecting a difference at every third predetermined pixel unit within the search range set by the operating unit, based on the plurality of differences at every primary predetermined pixel unit stored in the primary detector, and wherein, when a difference at every third predetermined pixel unit calculated by the third detector is a predetermined critical value or more, a mode for recording images to the recording medium is changed.

8. The surveillance system according to claim 7, wherein said display control unit reads image data from the recording medium with a predetermined size corresponding to the search range set by said operating unit, and outputs the image data to the display device.

9. The surveillance system according to claim 6, wherein after the second detector is selected to search presence/absence of the motion and the motion is not detected using the second detector, the control unit selects the primary detector to search presence/absence of the motion.

10. The surveillance system according to claim 6, wherein the recording medium comprises a hard drive.

11. The surveillance system according to claim 10, wherein, after a search of the hard drive occurring after the difference value at every second predetermined pixel unit is recorded to the hard drive together with the image data, image data is read from the hard drive and output to a display device upon the control unit detecting presence of the motion from the difference value of a corresponding second predetermined pixel unit read from the hard drive.

* * * * *